(12) United States Patent
Motosko, III

(10) Patent No.: US 8,113,470 B1
(45) Date of Patent: Feb. 14, 2012

(54) VARIABLE AIR FOIL AND SPOILER

(76) Inventor: Stephen Motosko, III, Sarasota, FL (US)

( * ) Notice: Subject to any disclaimer, the term of this patent is extended or adjusted under 35 U.S.C. 154(b) by 509 days.

(21) Appl. No.: 12/326,410

(22) Filed: Dec. 2, 2008

(51) Int. Cl.
  *B64C 3/44* (2006.01)
(52) U.S. Cl. ..................... 244/219; 296/180.5
(58) Field of Classification Search ............ 244/130, 244/46, 219; 296/180.5, 91
  See application file for complete search history.

(56) References Cited

U.S. PATENT DOCUMENTS

| | | | |
|---|---|---|---|
| 2,125,064 A * | 7/1938 | Burgess ...................... 244/219 |
| 2,288,750 A * | 7/1942 | Seeman ...................... 244/219 |
| 3,076,623 A * | 2/1963 | Lyon .......................... 244/215 |
| 3,158,338 A | 11/1964 | Cushman |
| 4,182,503 A | 1/1980 | Muscatell |
| 4,296,900 A | 10/1981 | Krall |
| 4,341,176 A * | 7/1982 | Orrison .................. 114/102.22 |
| 4,432,516 A * | 2/1984 | Muscatell ................ 244/219 |
| 4,538,539 A * | 9/1985 | Martin ...................... 114/140 |
| 4,582,278 A * | 4/1986 | Ferguson .................. 244/219 |
| 4,863,117 A | 9/1989 | Riout |
| 5,004,189 A | 4/1991 | Igram |
| 5,106,265 A * | 4/1992 | Holzem ...................... 416/23 |
| 5,181,678 A | 1/1993 | Widnall et al. |
| 5,433,404 A | 7/1995 | Ashill et al. |
| 5,531,407 A | 7/1996 | Austin et al. |
| 6,010,098 A * | 1/2000 | Campanile et al. ........ 244/219 |
| 6,015,115 A | 1/2000 | Dorsett et al. |
| 6,045,096 A | 4/2000 | Rinn et al. |
| 6,347,769 B1 | 2/2002 | To et al. |
| 6,622,974 B1 * | 9/2003 | Dockter et al. ............ 244/219 |

* cited by examiner

*Primary Examiner* — Benjamin P Lee
(74) *Attorney, Agent, or Firm* — Gifford, Krass, Sprinkle, Anderson & Citkowski, P.C.

(57) ABSTRACT

A variable lift, variable drag airfoil assembly including a leading edge and a trailing edge connected together in spaced apart relation and an elastic skin connected to and extending between the leading and trailing edges to define an airfoil profile. A resilient spring member positioned within said airfoil profile exerts biased outward pressure against a central portion of the lifting surface of the elastic skin to automatically create a varying thickness of said airfoil profile responsive to increased air speed over the airfoil profile wherein lift and drag of the airfoil assembly are proportionately reduced as airspeed increases. In a preferred embodiment, the airfoil assembly is inverted in the form of a rear spoiler of a land vehicle oriented transversely across a rear portion of the vehicle to produce an increasing downward road gripping force on the rear wheels of the vehicle with increasing vehicle speed while reducing the drag produced by the airfoil assembly.

7 Claims, 7 Drawing Sheets

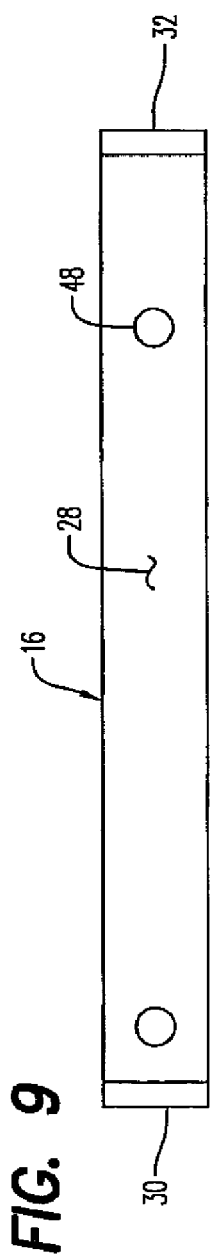
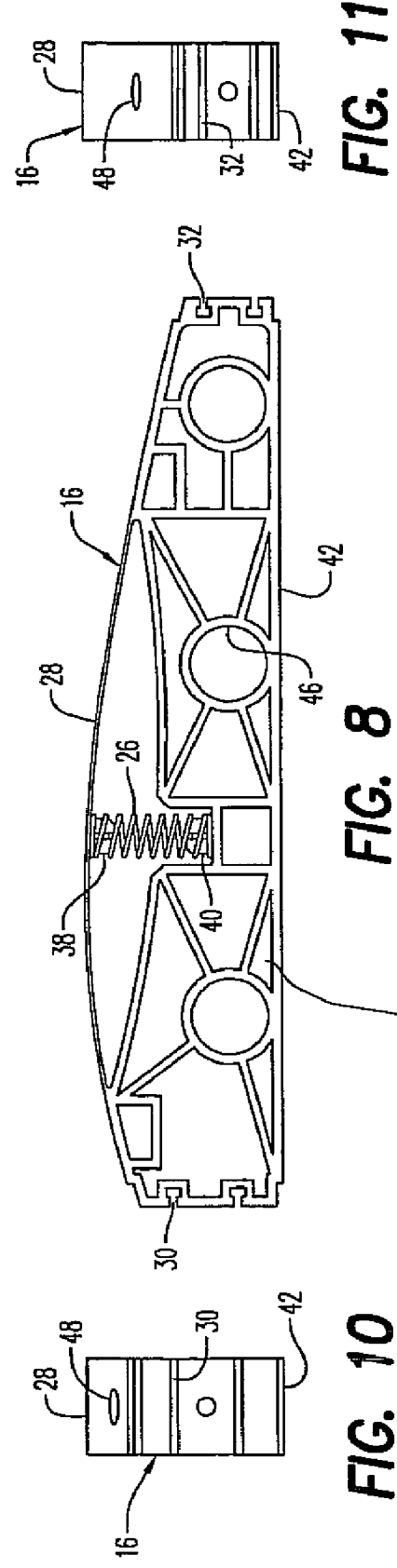
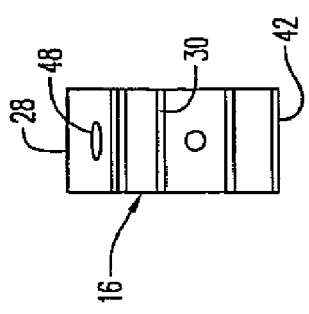

VARIABLE AIR FOIL AND SPOILER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to lifting airfoil structures, and more particularly to an airfoil or vehicle spoiler which automatically varies the thickness of the airfoil and therefore proportionately alters the lifting and drag characteristics depending upon the velocity of the air passing over the airfoil.

2. Description of Related Art

Airfoil structures are typically used for creating lift such as in wing, tail and elevator surfaces of an aircraft. The most traditional of these airfoils are fixed, having a top or lifting surface which is longer by virtue of its arcuate configuration than that of the lower surface of the airfoil thus producing lift which enables an aircraft to become airborne and to be maneuvered while in flight.

High speed racing land vehicles also use reverse airfoil structures also known as "spoilers" which produce a downward thrust on the rear portion of the vehicle to increase wheel traction and stability during high speed maneuvering of the vehicle. However, due to the conventional fixed configuration of the spoilers, they can become a bit of a detriment to achieving the vehicle maximum speed and performance due to the fact that the drag produced at higher vehicle speeds will inhibit achieving maximum racing performance of the vehicle.

Considerable effort has been expended in developing airfoil particularly for aircraft flight wherein the airfoil itself may be varied to achieve particular flight characteristics depending upon the speed and maneuvering needs of the aircraft.

U.S. Pat. No. 6,015,115 to Dorsett et al. discloses an aircraft airfoil having inflatable structures to control aircraft. A reconfigurable airfoil is taught by Igram in U.S. Pat. No. 5,004,189.

Riout teaches an improved contoured wing capable of controlled, variable deformation along its profile in U.S. Pat. No. 4,863,117. An airfoil having a relatively thin configuration for high-speed flight and a relatively thick configuration for low-speed flight is disclosed by Krall in U.S. Pat. No. 4,296,900.

U.S. Pat. No. 3,158,338 to Cushman discloses sustaining airfoils having variable configurations to control the lift characteristics of the airfoil. Muscatelli teaches an improved variable airfoil assembly having a fixed airfoil member with a recess in the top for receiving an adjustable airfoil member whose back end is pivoted in U.S. Pat. No. 4,182,503.

A flexible tailored elastic airfoil section is taught by Widnall et al. in U.S. Pat. No. 5,181,678. Ashill et al. teaches an airfoil having a variable geometry expansion surface for the active control of shock strength and transonic wave drag in U.S. Pat. No. 5,433,404.

U.S. Pat. No. 5,531,407 to Austin et al. discloses an apparatus and method for controlling the shape of structures for adaptive wings, hydrodynamic lifting surfaces, submarine hulls and other structures with one or more surfaces and internal actuators. An airfoil having a variable cross section to provide alterable lift characteristics is taught by Rinn et al. in U.S. Pat. No. 6,045,096. Pneumatic adaptive wings are disclosed in U.S. Pat. No. 6,347,769 to To et al.

The present invention, in one embodiment, provides an airfoil which automatically varies in thickness by modifying upper lifting surface of the airfoil responsive to velocity of the airfoil through air. At lower speeds, the airfoil achieves a maximum thickness produced by a biasing member urging the central portion of the lifting surface of the airfoil toward an outwardly-most configuration. However, as air flow increases due to the velocity of the airfoil through air, air pressure against the lifting surface acts against the biasing member to reduce the thickness of the airfoil and thus to reduce the overall lift and correspondingly reduce the air drag of the airfoil at higher speeds.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a variable lift, variable drag, airfoil assembly including a leading edge and a trailing edge connected together in spaced apart relation and an elastic skin connected to and extending between the leading and trailing edges to define an airfoil profile. A resilient spring member positioned within the airfoil profile exerts biased outward pressure against a central portion of the lifting surface of the elastic skin to automatically create a varying thickness of the airfoil profile responsive to increased air speed over the airfoil profile wherein lift and drag of the airfoil assembly are proportionately reduced as airspeed increases. In another embodiment, the airfoil assembly is inverted in the form of a rear spoiler of a land vehicle oriented transversely across a rear portion of the vehicle to produce an increasing downward road gripping force on the rear wheels of the vehicle with increasing vehicle speed while reducing the drag produced by the airfoil assembly.

It is therefore an object of this invention to provide an airfoil which proportionately produces less lift when moved through air, the airfoil being automatically reduced in overall thickness in proportion to velocity through air.

Another object of this invention is to provide an automatically diminishing lift and drag of an airfoil as the airfoil is moved at greater velocities through air.

Yet another object of this invention is to provide a spoiler for the rear of a high speed vehicle which produces downward stabilizing force on the rear wheels of the vehicle and which downward force proportionately decreases the rate of increasing lift at higher speeds and correspondingly results in proportionately less drag to slow the vehicle.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIG. 8 is a side elevation view of a typical rib member of FIG. 1.

FIG. 9 is a top plan view of FIG. 8.

FIG. 10 is a front elevation view of FIG. 8.

FIG. 11 is a rear elevation view of FIG. 8.

Exemplary embodiments are illustrated in reference figures of the drawings. It is intended that the embodiments and figures disclosed herein are to be considered to be illustrative rather than limiting.

DETAILED DESCRIPTION OF THE INVENTION

Lifting Airfoil

Figure 1:
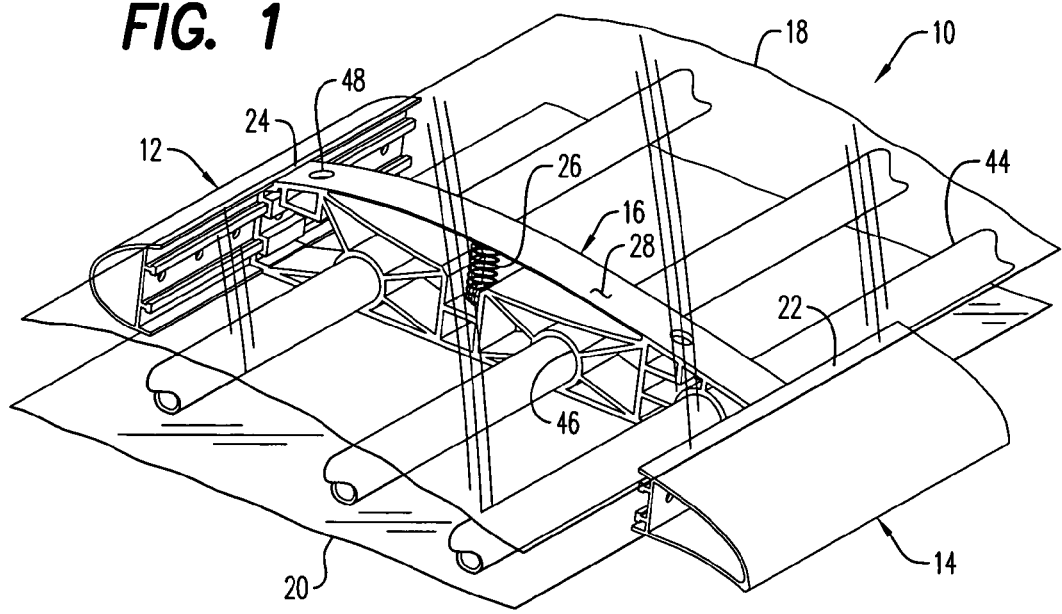
FIG. 1 is a perspective view of a section of the invention.
Figure 2:
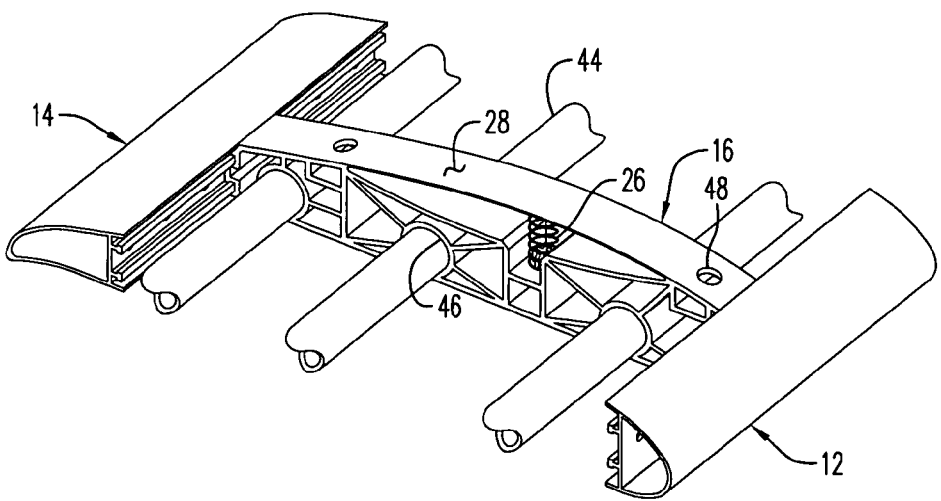
FIG. 2 is another perspective view of a section of the invention absent the flexible transparent airfoil skin for clarity.
Figure 3:
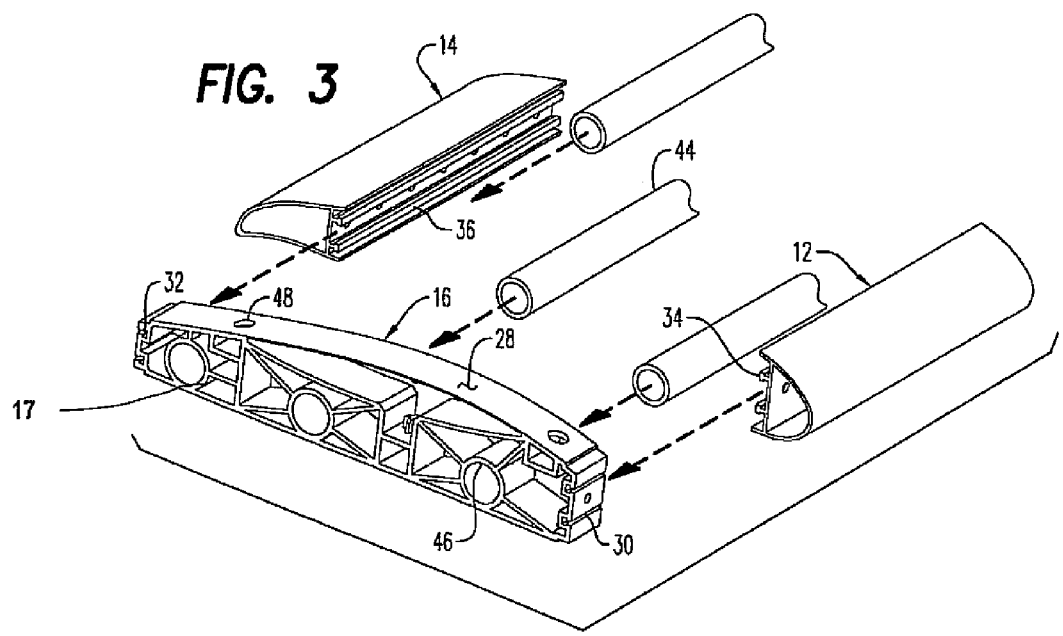
FIG. 3 is an exploded view of FIG. 2.
Figure 4:
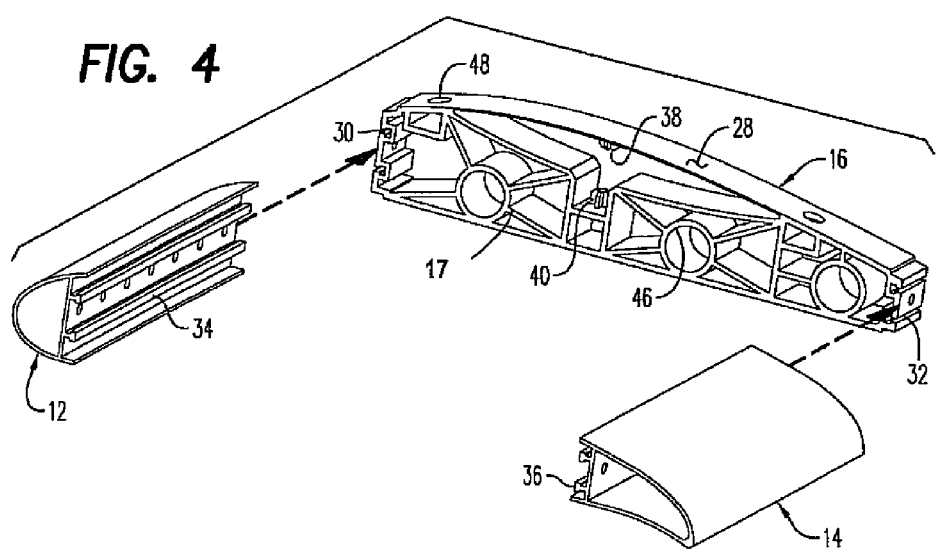
FIG. 4 is an exploded view of FIG. 1 absent the flexible airfoil skin for clarity.
Figure 5:
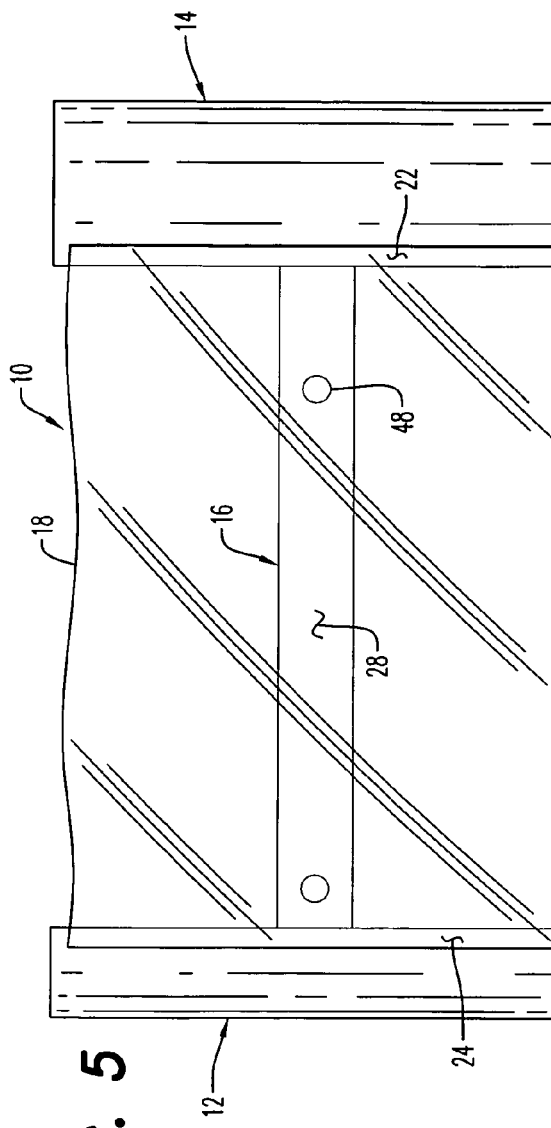
FIG. 5 is a top plan view of FIG. 1.

Referring now to the drawings, one embodiment of the invention shown in FIGS. 1 to 15 as an airfoil for producing lift such as for an aircraft, there shown generally at numeral 10 in FIGS. 1 and 5. The airfoil assembly 10 includes a leading edge member 12, a trailing edge member 14 spaced apart from the leading edge member 12, and at least one spaced transversely extending rib members 16 which are covered by a thin skin of transparent Mylar 18 and 20 which define the lifting and bottom airfoil surfaces, respectively.

Each of the rib members 16 includes C-shaped channels 30 and 32 along the leading and trailing faces thereof, respectively. As best seen in FIG. 4, channels 30 slidably interengage with elongated rails 34 lengthwise of the leading edge 12, while channels 32 slidably engage with rails 36 lengthwise of trailing edge 14. To strengthen the overall load carrying capability of this airfoil assembly 10, several spaced apart round spars 44 slidably may engage through mating channels 46 of each of the rib members 16. The transparent Mylar skin panels 18 and 20 are then mechanically or adhesively attached along margins 22 and 24 of the trailing and leading edges 14 and 12, respectively. Once so attached, the Mylar skins 18 and 20 may then be heat shrunk in place for tautness and overall structural enhancement of the assembly 10. Note alternately that the thin Mylar skins 18 and 20 may be fabricated of thin metallic or non-metallic panels where transparency for aesthetic purposes is not desirable or for added strength and puncture and piercing resistance.

Each of the rib members 16 includes a body portion 17 and an integrally formed thin arcuately formed top cap strip 28 beneath which and within the interior of the airfoil assembly 10 is a compression spring 26 held in compression between spring seat 38 on an interior surface of the cap strip 28 and spring seat 40. The cap strip 28 has a first end, an opposite second end, and a central portion disposed therebetween. The first and second ends are connected to the body portion 17, and the central portion is spaced apart from the body portion. On installation, the at rest position of the cap strip 28 is as shown in solid in FIG. 6, again with the compression spring 26 under slight compression. These caps strips 28 further define the overall airfoil lifting surface of the airfoil assembly 10 by supporting the top skin 18 directly atop the outer surface of each of the cap strips 28. The skin panel 20 extends across the leading edge member 12, a side 42 of the body portion 17 opposite the cap strip 28, and the trailing edge member 14.

Figure 6:
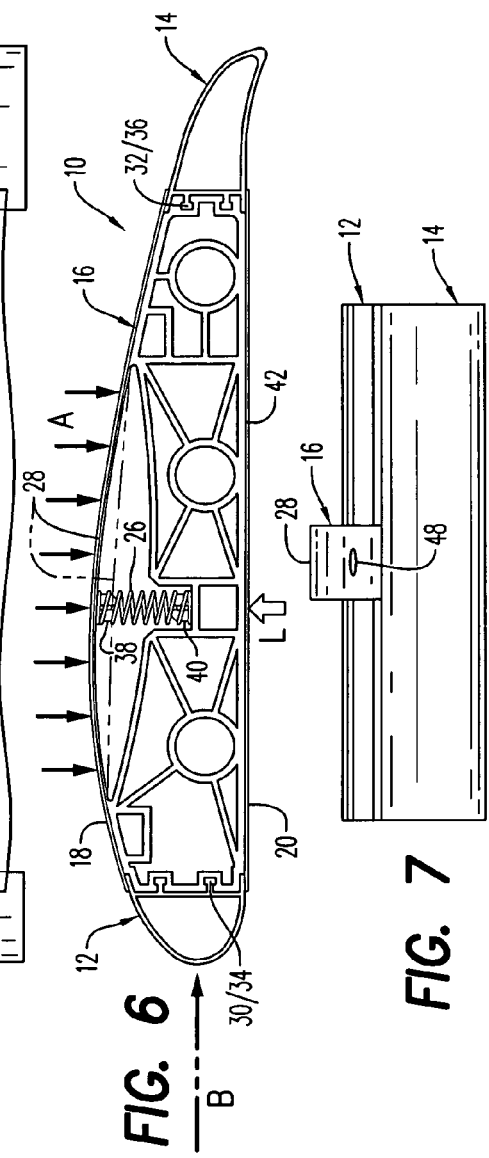
FIG. 6 is a side elevation view of FIG. 5.
Figure 7:
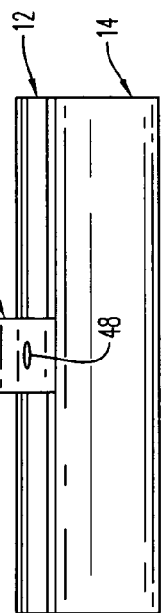
FIG. 7 is a rear elevation view of FIG. 5.
Figure 12:
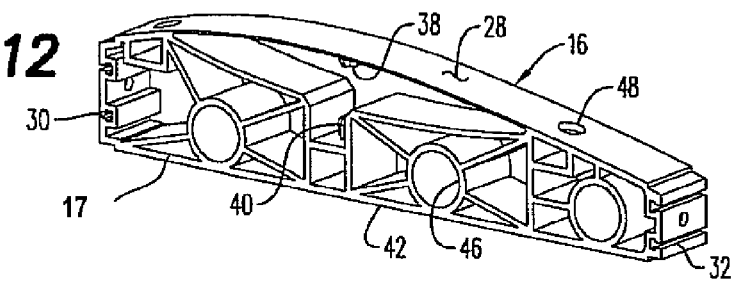
FIGS. 12 to 15 are various perspective views of FIG. 8.
Figure 13:
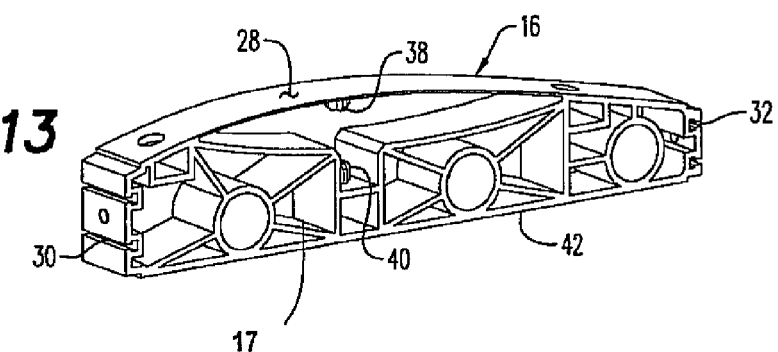
Figure 14:
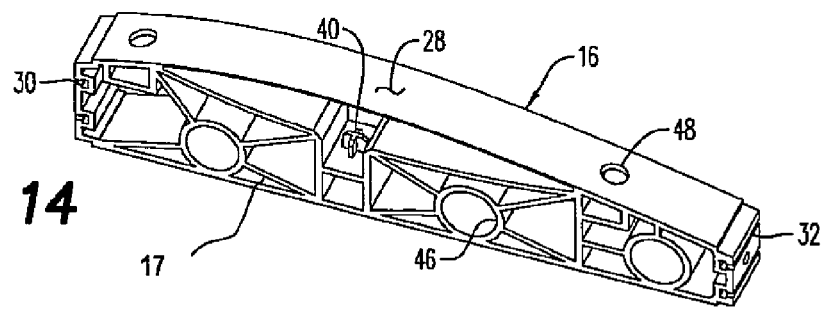
Figure 15:
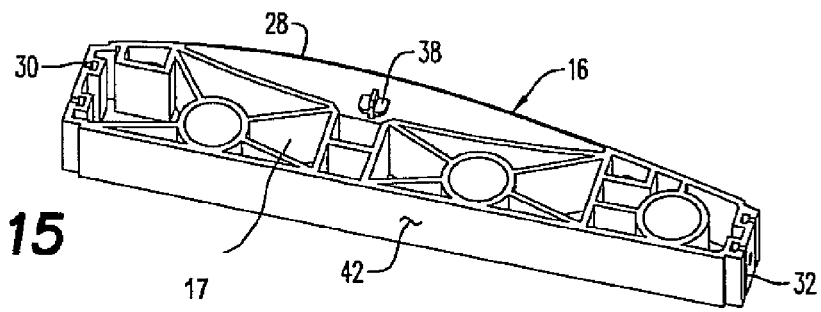

Air flow in the direction of arrow B in FIG. 6 passes over each of the upper and lower airfoil skin surfaces 18 and 20 to produce lift L in a well known manner. However, as the velocity of the airflow over the lifting surface defined by skin 18 increases, the airfoil skin 18 comes under air pressure to reduce the overall thickness of the airfoil assembly 10 in the direction of the arrows. As a result of the overall thinning of the airfoil section into the configuration of cap strip 28 shown in phantom, the drag produced against the leading edge 12 of the airfoil in the direction of arrow B will proportionately decrease with increases in velocity as will the overall lift L produced by this airfoil assembly 10.

Vehicle Spoiler

Figure 16:
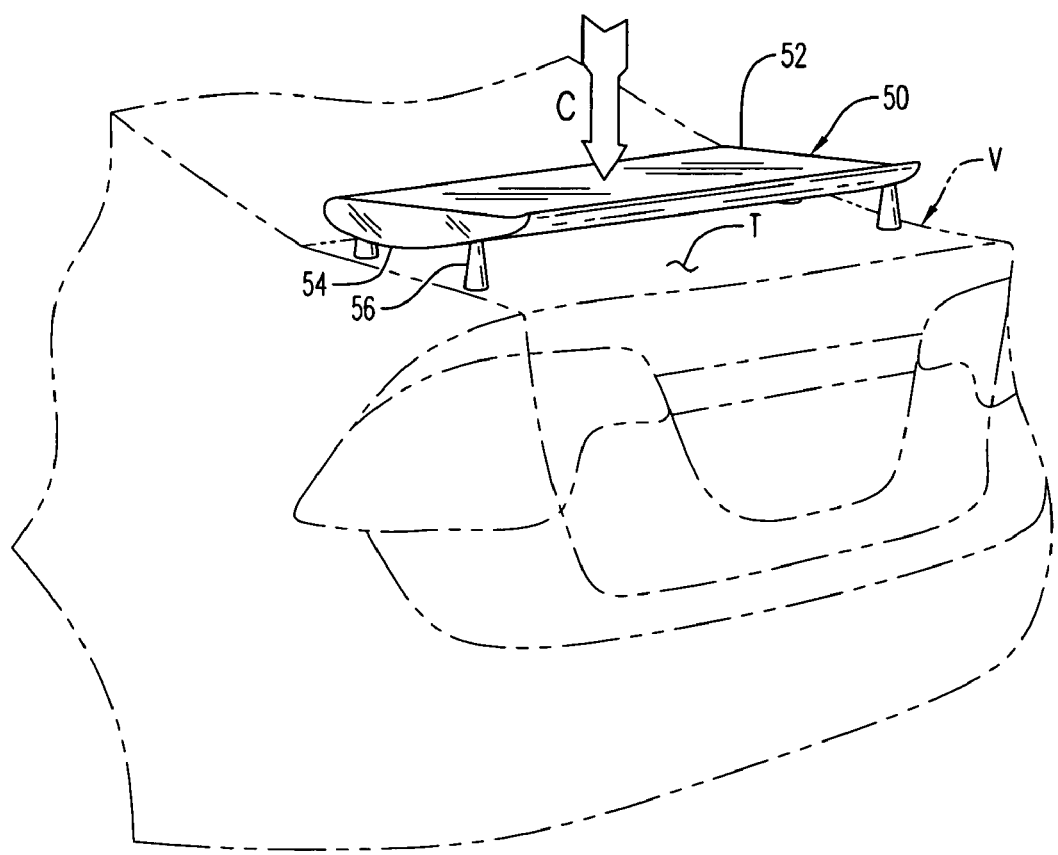
FIG. 16 is a rear perspective view of the rear portion of a vehicle with an inverted embodiment of the invention connected thereto.
Figure 17:
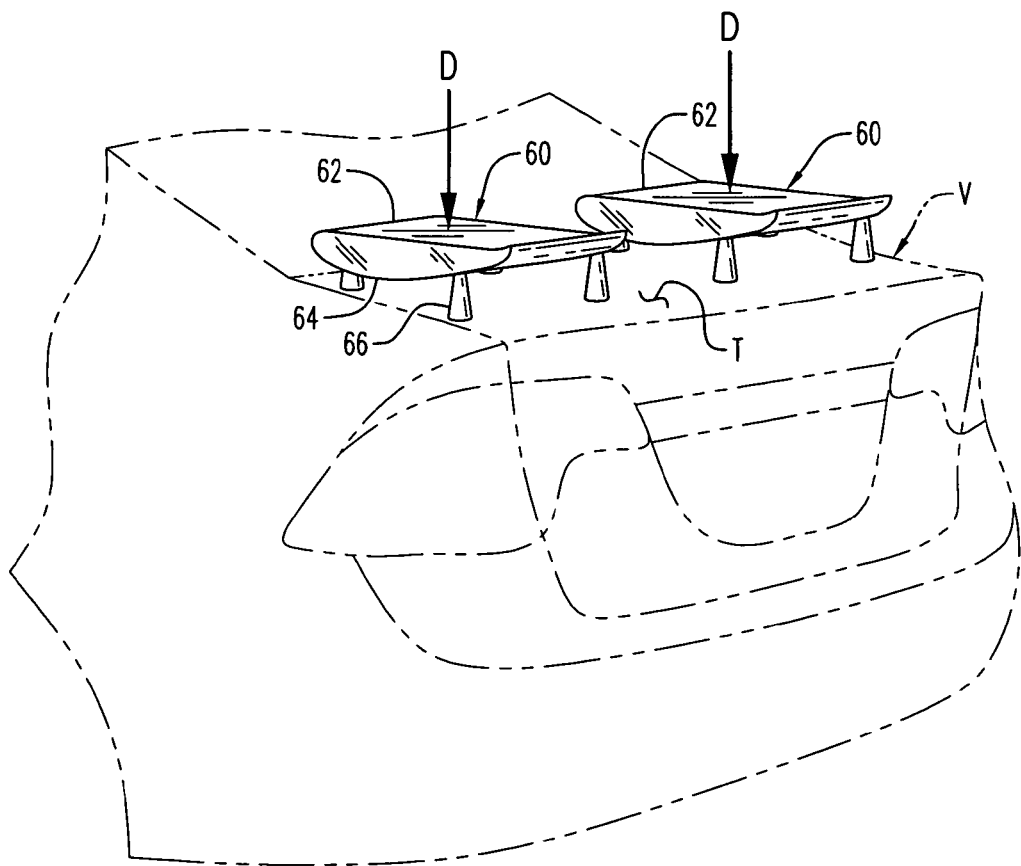
FIG. 17 is a two-part embodiment of the invention shown in FIG. 16.

Referring now to FIGS. 16 and 17, another preferred embodiment of the use of the invention is there shown generally at numeral 50 in FIG. 16 and in a split or bifurcated form at 60 in FIG. 17. The spoiler 50 includes an airfoil assembly 52 similar to that described at numeral 10 previously. The spoiler 50 is attached to the rear deck or trunk T by mounting posts bolted in place through the trunk T and apertures 48 through the cap strip 28. However, the lifting surface 54 is oriented downwardly so that, as the vehicle V shown in phantom increases in forward velocity, the downward force C produced by the airfoil 52 increases. This downward force C acts upon the rear suspension and rear wheels of the vehicle V to enhance and increase traction and stability as the vehicle V reaches higher velocities.

By incorporating the reduction in overall thickness of the airfoil 52 as previously described, the proportionate downward stabilizing force C in FIG. 16 with increased vehicle speed will be accompanied by an overall proportionate decrease in drag build-up produced by the airfoil 52 to both increase fuel economy and increase the overall speed efficiency of the vehicle V.

In FIG. 17, a split version of this system is shown at 60 and includes two separate inverted airfoil assemblies 62, each of which is connected to the deck or trunk T of the vehicle V by attaching posts 64. The downward stabilizing force D produced by the lifting surface 64 will again decrease proportionately with speed along with the drag produced by these airfoil sections 62 with vehicle velocity.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. An airfoil assembly comprising:

an elongated leading edge member;

an elongated trailing edge member spaced apart from said leading edge member;

at least one rib member interconnecting said leading edge member and said trailing edge member, said rib member having an integrally formed body portion and a deformable cap strip, said cap strip having a first end, an opposite second end, and a central portion disposed between said first end and said second end, said first end and said second end being connected to said body portion, and said central portion being spaced apart from said body portion;

an elastic skin connected to and extending across said leading edge member, an exterior surface of said central portion of said cap strip, and said trailing edge member to define an airfoil profile; and a biasing member positioned between said body portion of said rib member and an interior surface of said central portion of said cap strip, said biasing member exerting biased outward pressure against a central portion of said elastic skin through said cap strip to automatically create a varying thickness of said airfoil profile wherein lift and drag of said airfoil assembly are proportionately reduced with increasing airspeed.

2. The airfoil assembly of claim 1, wherein:

said airfoil assembly is inverted in the form of a rear spoiler of a land vehicle which is transversely oriented and connected on a rear portion of the vehicle to produce an increasing downward road gripping force on the rear wheels of the vehicle with increasing vehicle speed while reducing the drag produced by the airfoil assembly.

3. The airfoil assembly of claim 2, wherein:

said airfoil assembly is formed in two separate and spaced apart assembly portions.

4. The airfoil assembly of claim 1, wherein a distance between said leading edge member and said trailing edge member is a fixed distance.

5. The airfoil assembly of claim 1, wherein said body portion of said rib member has a first end and an opposite second end, wherein said first end is connected to said leading edge member and said second end is connected to said trailing edge member.

6. The airfoil assembly of claim 5, wherein said skin extends only along a margin of said leading edge member adjacent the connection between said leading edge member and said first end of said body portion of said rib member, and wherein said skin extends only along a margin of said trailing edge member adjacent the connection between the trailing edge member and said second end of said body portion of said rib member.

7. The airfoil assembly of claim 1, wherein a second elastic skin is connected to and extends across said leading edge member, a side of said body portion of said rib member opposite said cap strip, and said trailing edge member.

* * * * *